United States Patent
Kuhlman et al.

(10) Patent No.: US 12,257,991 B2
(45) Date of Patent: Mar. 25, 2025

(54) AUTOMATED BRAKING CONTROL SYSTEMS

(71) Applicant: Robert Bosch GmbH, Stuttgart (DE)

(72) Inventors: Ryan A. Kuhlman, Pinckney, MI (US); Erica Hingst, Plymouth, MI (US); Guillaume Hastoy, Novi, MI (US); Samuel Steele, Ypsilanti, MI (US)

(73) Assignee: Robert Bosch GmbH, Stuttgart (DE)

( * ) Notice: Subject to any disclaimer, the term of this patent is extended or adjusted under 35 U.S.C. 154(b) by 657 days.

(21) Appl. No.: 17/516,351

(22) Filed: Nov. 1, 2021

(65) Prior Publication Data
US 2023/0134211 A1 May 4, 2023

(51) Int. Cl.
*B60T 17/22* (2006.01)
*B60T 7/12* (2006.01)
*B60T 8/92* (2006.01)

(52) U.S. Cl.
CPC ................ *B60T 7/12* (2013.01); *B60T 8/92* (2013.01); *B60T 17/221* (2013.01);
(Continued)

(58) Field of Classification Search
CPC . B60T 7/12; B60T 8/92; B60T 17/221; B60T 2201/10; B60T 2210/20; B60T 2250/00; B60T 2270/402; B60T 270/406
(Continued)

(56) References Cited

U.S. PATENT DOCUMENTS

| | | | | |
|---|---|---|---|---|
| 5,139,315 A | * | 8/1992 | Walenty | B60T 7/12 303/162 |
| 5,984,429 A | * | 11/1999 | Nell | B60T 8/4275 303/155 |

(Continued)

FOREIGN PATENT DOCUMENTS

| | | |
|---|---|---|
| GB | 2311345 A | 9/1997 |
| WO | 2011096938 A1 | 8/2011 |

OTHER PUBLICATIONS

International Search Report for Application No. PCT/EP2022/079439 dated Feb. 13, 2023 (5 pages).

*Primary Examiner* — Hung Q Nguyen
*Assistant Examiner* — Anthony Donald Taylor, Jr.
(74) *Attorney, Agent, or Firm* — Michael Best & Friedrich LLP

(57) ABSTRACT

Systems and methods for controlling a vehicle. One example system includes a deceleration actuator coupled to a first wheel of the vehicle and an electronic processor communicatively coupled to the deceleration actuator. The electronic processor is configured to receive a vehicle park command. The electronic processor is configured to, responsive to receiving the vehicle park command, determine a maximum holding pressure threshold. The electronic processor is configured to determine a requested braking pressure for the deceleration actuator. The electronic processor is configured to determine whether the requested braking pressure exceeds the maximum holding pressure threshold. The electronic (Continued)

processor is configured to, responsive to determining that the requested braking pressure does not exceed the maximum holding pressure threshold, control the deceleration actuator to apply, to the first wheel during a hold time, a holding braking pressure equivalent to the requested braking pressure.

21 Claims, 6 Drawing Sheets

(52) U.S. Cl.
CPC ....... *B60T 2201/10* (2013.01); *B60T 2210/20* (2013.01); *B60T 2250/00* (2013.01); *B60T 2270/402* (2013.01); *B60T 2270/406* (2013.01)

(58) Field of Classification Search
USPC .......................................................... 701/70
See application file for complete search history.

(56) References Cited

U.S. PATENT DOCUMENTS

| | | |
|---|---|---|
| 6,502,908 B1 * | 1/2003 | Mueller ................ B60W 30/17 |
| | | 303/191 |
| 6,994,407 B2 | 2/2006 | Kinder et al. |
| 9,702,456 B2 | 7/2017 | Yoon et al. |
| 9,896,071 B2 | 2/2018 | Korte et al. |
| 10,407,068 B2 | 9/2019 | Goh |
| 10,940,836 B2 | 3/2021 | Henel et al. |
| 2013/0226425 A1 * | 8/2013 | Oliveira ................. B60T 7/122 |
| | | 701/70 |
| 2016/0244039 A1 | 8/2016 | Rizzo et al. |
| 2017/0137008 A1 * | 5/2017 | Takase .................. B60T 13/142 |
| 2018/0362002 A1 * | 12/2018 | Henel ..................... B60T 7/122 |
| 2021/0039645 A1 | 2/2021 | Hoshi et al. |

* cited by examiner

AUTOMATED BRAKING CONTROL SYSTEMS

BACKGROUND OF THE INVENTION

Drivers of delivery vehicles, garbage trucks, and the like, frequently exit and enter their vehicles throughout the day to perform their duties. Exiting the vehicle requires the engaging a parking pawl or a parking brake to secure the vehicle while the driver is outside of the vehicle performing a task. When the driver returns to the vehicle, the parking pawl or parking brake must be disengaged prior to resuming driving.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
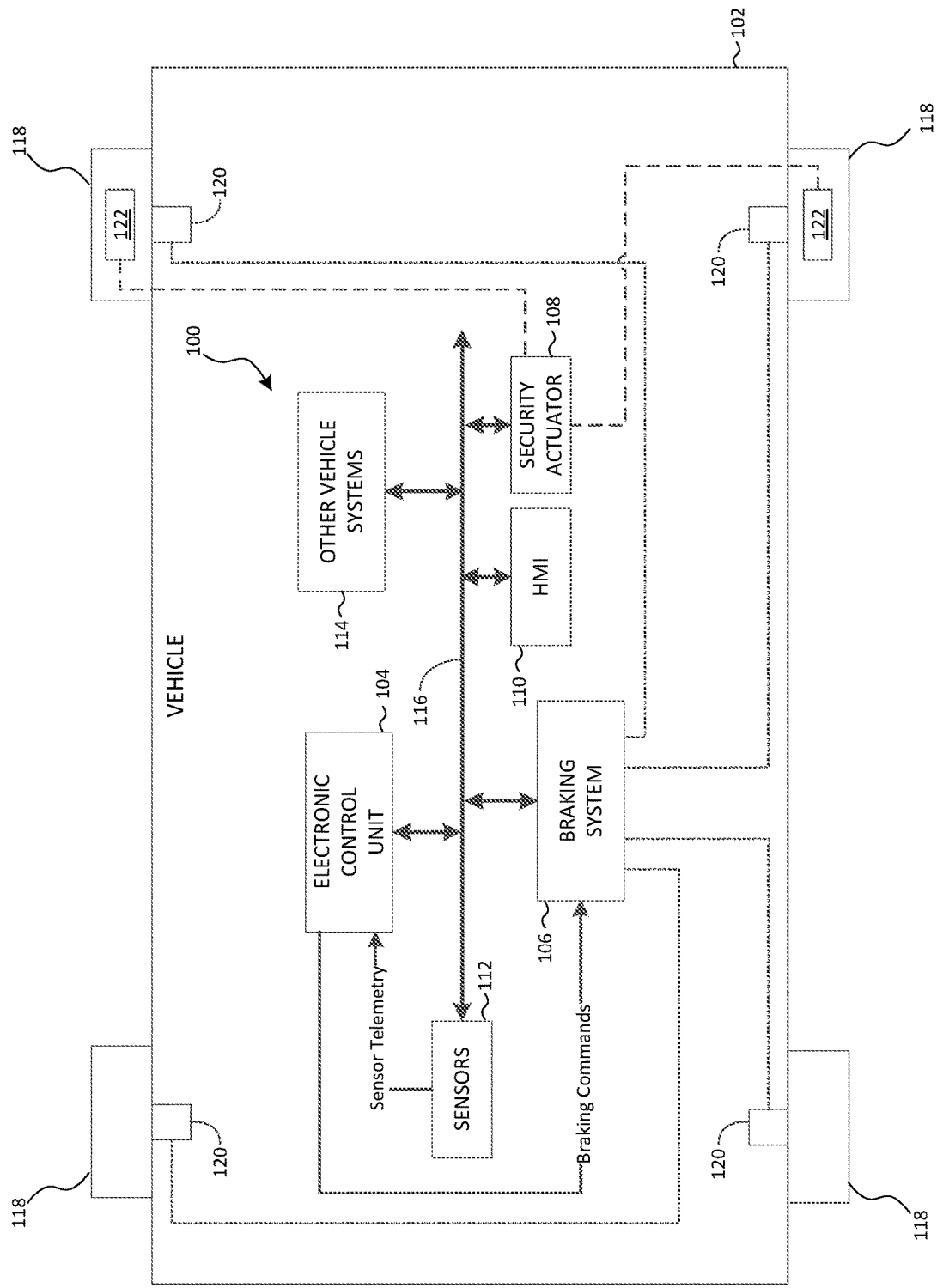
FIG. 1 is a block diagram of a vehicle control system, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Certain vehicle uses require the driver to stop at numerous locations throughout a shift or other time period to exit and enter the vehicle (e.g., to pick up or deliver a parcel, empty a refuse container, write a parking ticket, or engage with a public safety incident). While the driver is outside of the vehicle, the vehicle is secured by a security mechanism (e.g., a parking brake) to keep the vehicle from moving while not under the control of the driver. When the driver returns to the vehicle, the driver must disengage the security mechanism before driving on from the location.

Engaging a security mechanism, whether manually or automatically, (e.g., a parking brake, an electric parking brake, or a parking pawl of an automatic transmission) takes additional time (compared to the time required to bring the vehicle to a stop with the brakes) and requires a driver to confirm the mechanism's engagement prior to exiting the vehicle. Similarly, disengagement of the security mechanism prior to resuming driving requires additional time (as compared to simply activating the accelerator). Additionally, the frequent usage of security mechanisms results in increased maintenance as compared to other vehicle uses. For example, a delivery vehicle may make up to 700,000 deliveries in its useful lifetime, while a parking brake may only support 150,000 usage cycles.

To address, among other things, these problems, systems and methods are provided herein for a Stop, Drop, and Go (SDG) vehicle control feature, which enables hydraulic holding of a vehicle without the presence or control of a driver. Among other things, embodiments presented herein automatically hold a vehicle in place by maintaining a driver-requested braking pressure with the hydraulic vehicle braking system after the driver has exited the vehicle. Using such embodiments, the vehicle is held in place for a limited time period without applying a parking brake, parking pawl, or other security mechanism. The driver, upon returning to the vehicle, begins driving the vehicle, which triggers the hydraulic holding to cease. Such embodiments presented herein allow a driver to leave the vehicle to perform a task, return, and drive away without waiting for the engagement or disengagement of a parking brake, parking pawl, or other security mechanism. Such embodiments increase driver convenience and efficiency and reduce wear and tear on vehicle components.

One example embodiment provides a system for controlling a vehicle. The system includes a deceleration actuator coupled to a first wheel of the vehicle and an electronic processor communicatively coupled to the deceleration actuator. The electronic processor is configured to receive a vehicle park command. The electronic processor is configured to, responsive to receiving the vehicle park command, determine a maximum holding pressure threshold. The electronic processor is configured to determine a requested braking pressure for the deceleration actuator. The electronic processor is configured to determine whether the requested braking pressure exceeds the maximum holding pressure threshold. The electronic processor is configured to, responsive to determining that the requested braking pressure does not exceed the maximum holding pressure threshold, control the deceleration actuator to apply, to the first wheel during a hold time, a holding braking pressure equivalent to the requested braking pressure.

Another example embodiment provides a method for controlling a vehicle. The method includes receiving, with an electronic processor, a vehicle park command. The method includes, responsive to receiving the vehicle park command, determining, with the electronic processor, a maximum holding pressure threshold. The method includes determining a requested braking pressure for a deceleration actuator coupled to a first wheel of the vehicle. The method includes determining whether the requested braking pressure exceeds the maximum holding pressure threshold. The method includes, responsive to determining that the requested braking pressure does not exceed the maximum holding pressure threshold, controlling the deceleration actuator to apply, to the first wheel during a hold time, a holding braking pressure equivalent to the requested braking pressure Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Also, it is to be understood that the phraseology and terminology used herein is for the purpose of description and should not be regarded as limiting. The terms "mounted," "connected" and "coupled" are used broadly and encompass both direct and indirect mounting, connecting, and coupling. Further, "connected" and "coupled" are not restricted to physical or mechanical connections or couplings, and can include electrical connections or couplings, whether direct or indirect. Also, electronic communications and notifications may be performed using any known means including wired connections, wireless connections, etc.

It should also be noted that a plurality of hardware and software based devices, as well as a plurality of different structural components may be utilized to implement the invention. It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. For example, "control units" and "controllers" described in the specification can include one or more processors, one or more memory modules including non-transitory computer-readable medium, one or more input/output interfaces, and various connections (e.g., a system bus) connecting the components.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

FIG. 1 is a block diagram of one exemplary embodiment of a vehicle control system 100. In the example illustrated, the vehicle control system 100 is mounted on, or integrated into, a vehicle 102. In some embodiments, the vehicle 102 is a delivery vehicle operated by a driver.

It should be noted that, in the description that follows, the term "vehicle" may refer to a conventional non-autonomous motor vehicle, a partially autonomous vehicle, or a fully autonomous vehicle, any of which may possess varying degrees of automation (that is, the vehicle is configured to drive itself with limited, or in some cases no, input from a driver). The systems and methods described herein may be used with any vehicle capable of operating partially or fully autonomously, being controlled manually by a driver, or some combination of both.

In should also be noted that the term "driver," as used herein, generally refers to an occupant of a vehicle, autonomous vehicle, or semi-autonomous vehicle, who is seated in the driver's position, operates the controls of the vehicle while in a manual mode, or provides control input to the vehicle to influence the autonomous or semi-autonomous operation of the vehicle.

In the example illustrated, the system 100 includes an electronic control unit 104, a braking system 106, a security actuator 108, and a human machine interface (HMI) 110. The components of the system 100, vehicle sensors 112, and other vehicle systems 114, along with other various modules and components (not shown) are electrically coupled to each other by or through one or more control or data buses (e.g., the bus 116), which enable communication therebetween. The use of control and data buses for the interconnection between, and communication among, the various modules and components would be known to a person skilled in the art in view of the invention described herein. In some embodiments, the bus 116 is a Controller Area Network (CAN™) bus. In some embodiments, the bus 116 is an automotive Ethernet™, a FlexRay™ communications bus, or another suitable wired bus. In alternative embodiments, some or all of the components of the system 100 may be communicatively coupled using suitable wireless modalities (e.g., Bluetooth™ or near field communication).

Figure 2:
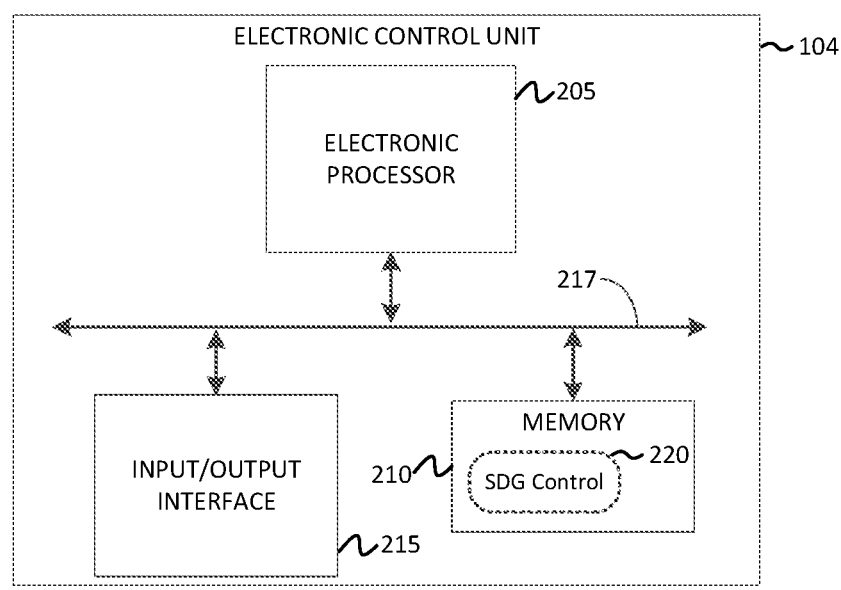
FIG. 2 schematically illustrates an electronic controller of the system of FIG. 1, in accordance with some embodiments.

The electronic control unit 104, described more particularly with respect to FIG. 2, is configured to control aspects of the operation of the vehicle 102, including the braking system 106 and the security actuator 108, to, among other things, implement the Stop, Drop, and Go features (e.g., based on commands received from the HMI 110 and sensor telemetry received from vehicle sensors 112), as described herein.

The braking system 106 is a braking system that utilizes a frictional braking force to inhibit the motion of one or more of the wheels 118 of the vehicle 102 in order to slow the vehicle 102, stop the vehicle 102, or prevent the vehicle 102 from moving. As described herein, the electronic control unit 104 is configured to send braking commands (e.g., via the bus 116) to the braking system 106 to control deceleration actuators to apply braking forces to the wheels 118. For example, in the embodiment illustrated each of the wheels 118 are fitted with braking calipers 120 (also referred to herein as deceleration actuators), which apply a frictional braking force that inhibits the motion of rotors connected to the wheels 118. In some embodiments, the braking system 106 is a conventional hydraulic braking system. In some embodiments, the braking system 106 includes a regenerative braking system. The regenerative braking system, during a braking maneuver, causes an electric motor (not shown) to act as a generator and stores or redistributes the power generated by the motor. The act of generating power creates a braking torque on the motor that is transmitted to one or more of the wheels 118 that the motor is coupled to in order to slow and/or stabilize the vehicle 102.

The security actuator 108 is a mechanism for preventing the vehicle 102 from moving when the vehicle is in a motionless state. In some embodiments, the security actuator controls one or both of the parking brakes 122 to apply a frictional braking force to inhibit the motion of one or more of the wheels 118 of the vehicle 102 in order to prevent the vehicle 102 from moving. In some embodiments, the parking brakes 122 are electronic parking brakes. In some embodiments, the security actuator 108 controls a parking pawl in an automatic transmission (not shown) of the vehicle 102 to prevent the vehicle 102 from moving.

In some embodiments, the electronic control unit 104 controls aspects of the operation of the vehicle 102 based on commands received from the human machine interface (HMI) 110. The HMI 110 provides an interface between the components of the system 100 and a driver of the vehicle 102. The HMI 110 is configured to receive input from the driver, receive indications of vehicle status from the system's controllers (e.g., the electronic control unit 104), and provide information to the driver, based on the received indications. The HMI 110 provides suitable input methods (e.g., buttons, knobs, a touch-screen display having menu options, voice recognition, and the like) to, for example, activate and deactivate vehicle control modes such as, for example, the SDG controls described herein. In some embodiments, the HMI 110 may also be configurable to provide audio output, visual output, haptic feedback, or some combination thereof to indicate to the driver the status of the vehicle 102.

In some embodiments, the electronic control unit 104 controls aspects of the operation of the vehicle 102 based on data and readings received from the vehicle sensors 112. The vehicle sensors 112 determine one or more attributes of the vehicle and its surrounding environment and communicate information regarding those attributes to the other components of the system 100 using, for example, electrical signals. Vehicle attributes include, for example, the position of the vehicle or portions or components of the vehicle, the movement of the vehicle or portions or components of the vehicle, the forces acting on the vehicle or portions or components of the vehicle, the proximity of the vehicle to other vehicles or objects (stationary or moving). In some embodiments, the vehicle sensors 112 include a vehicle pitch sensor, which senses the pitch of the vehicle 102 along its longitudinal axis. In some embodiments, the vehicle sensors 112 include wheel speed sensors for sensing rotation in the wheels 118. The vehicle sensors 112 may also include, for example, vehicle control sensors (e.g., sensors that detect accelerator pedal position, brake pedal position, and steering wheel position [steering angle]), vehicle speed sensors, yaw sensors, force sensors, odometry sensors, and vehicle proximity sensors (e.g., camera, radar, LIDAR, and ultrasonic). In some embodiments, the vehicle sensors 112 include one or more cameras configured to capture one or more images of the environment surrounding the vehicle 102 according to their respective fields of view. The cameras may include multiple types of imaging devices/sensors, each of which may be located at different positions on the interior or exterior of the vehicle 102. In some embodiments, the vehicle sensors 112 include a driver occupancy sensor configured to sense whether a driver is absent from or present in the vehicle 102. For example, a driver seat may include a pressure actuated switch for sensing when driver is occupying the driver seat. In another example, cameras, infrared sensors, or another suitable means may be positioned in the interior of the vehicle to detect the presence of a driver in a driving position (e.g., standing or sitting at the vehicle steering, braking, and acceleration controls). In another example, a hands on detection indication (or lack thereof) from a steering system of the vehicle 102 may be used to determine whether a driver is absent from or present in the vehicle 102.

In some embodiments, the system 100 includes, in addition to the sensors 112, a GNSS (global navigation satellite system) system (not shown) that determines geo-spatial positioning (i.e., latitude, longitude, altitude, and speed) for the vehicle based on received satellite radiofrequency signals. The electronic control unit 104 may use this information in conjunction with information received from the vehicle sensors 112 when controlling the vehicle 102.

In some embodiments, the electronic control unit 104 sends and receives data and commands relating to the operation of the vehicle 102 to the other vehicle systems 114. The other vehicle systems 114 include software and hardware (e.g., controllers, sensors, actuators, and the like) for controlling certain aspects of the operation of the vehicle 102 (e.g., steering, acceleration, shifting gears, highly automated parking, electronic stability control, and the like).

In some embodiments, the system 100 includes fault tolerance features, including, but not limited to, redundant electronic control units; redundant braking systems; redundant security actuators; providing power to the electronic control unit 104, the braking system 106, and the security actuator 108 with independent power sources; independent control of the parking brakes by multiple security actuators; and the like. In some embodiments, the failure of a power source triggers automatic engagement of one or more of the deceleration actuators and the security actuator to ensure that the vehicle 102 is stopped and secured.

FIG. 2 illustrates an exemplary embodiment of an electronic control unit 104, which includes an electronic processor 205 (e.g., a microprocessor, application specific integrated circuit, etc.), a memory 210, and an input/output interface 215. The memory 210 may be made up of one or more non-transitory computer-readable media and includes at least a program storage area and a data storage area. The program storage area and the data storage area can include combinations of different types of memory, such as read-only memory ("ROM"), random access memory ("RAM"), electrically erasable programmable read-only memory ("EEPROM"), flash memory, or other suitable memory devices. The electronic processor 205 is coupled to the memory 210 and the input/output interface 215 (e.g., via a control and data bus 217). The electronic processor 205 sends and receives information (e.g., from the memory 210 and/or the input/output interface 215) and processes the information by executing one or more software instructions or modules, capable of being stored in the memory 210, or another non-transitory computer readable medium. The software can include firmware, one or more applications, program data, filters, rules, one or more program modules, and other executable instructions. The electronic processor 205 is configured to retrieve from the memory 210 and execute, among other things, software for performing methods as described herein. In the embodiment illustrated, the memory 210 stores, among other things, a Stop, Drop, and Go engine 220.

The input/output interface 215 transmits and receives information from devices external to the electronic control unit 104 (e.g., over one or more wired and/or wireless connections), for example, components of the system 100 via the bus 116. The input/output interface 215 receives user input, provides system output, or a combination of both. As described herein, user input from a driver the vehicle 102 may be provided via, for example, the braking system 106 and the human machine interface 110. The input/output interface 215 may also include other input and output mechanisms, which for brevity are not described herein and which may be implemented in hardware, software, or a combination of both.

It should be understood that although FIG. 2 illustrates only a single electronic processor 205, memory 210, and input/output interface 215, alternative embodiments of the electronic control unit 104 may include multiple processing units, memory modules, and/or input/output interfaces. It should also be noted that the system 100 may include other electronic controllers, each including similar components as, and configured similarly to, the electronic control unit 104. In some embodiments, the electronic control unit 104 is implemented partially or entirely on a semiconductor (e.g., a field-programmable gate array ["FPGA"] semiconductor) chip. Similarly, the various modules and controllers described herein may be implemented as individual controllers, as illustrated, or as components of a single controller. In some embodiments, a combination of approaches may be used.

Figure 3:
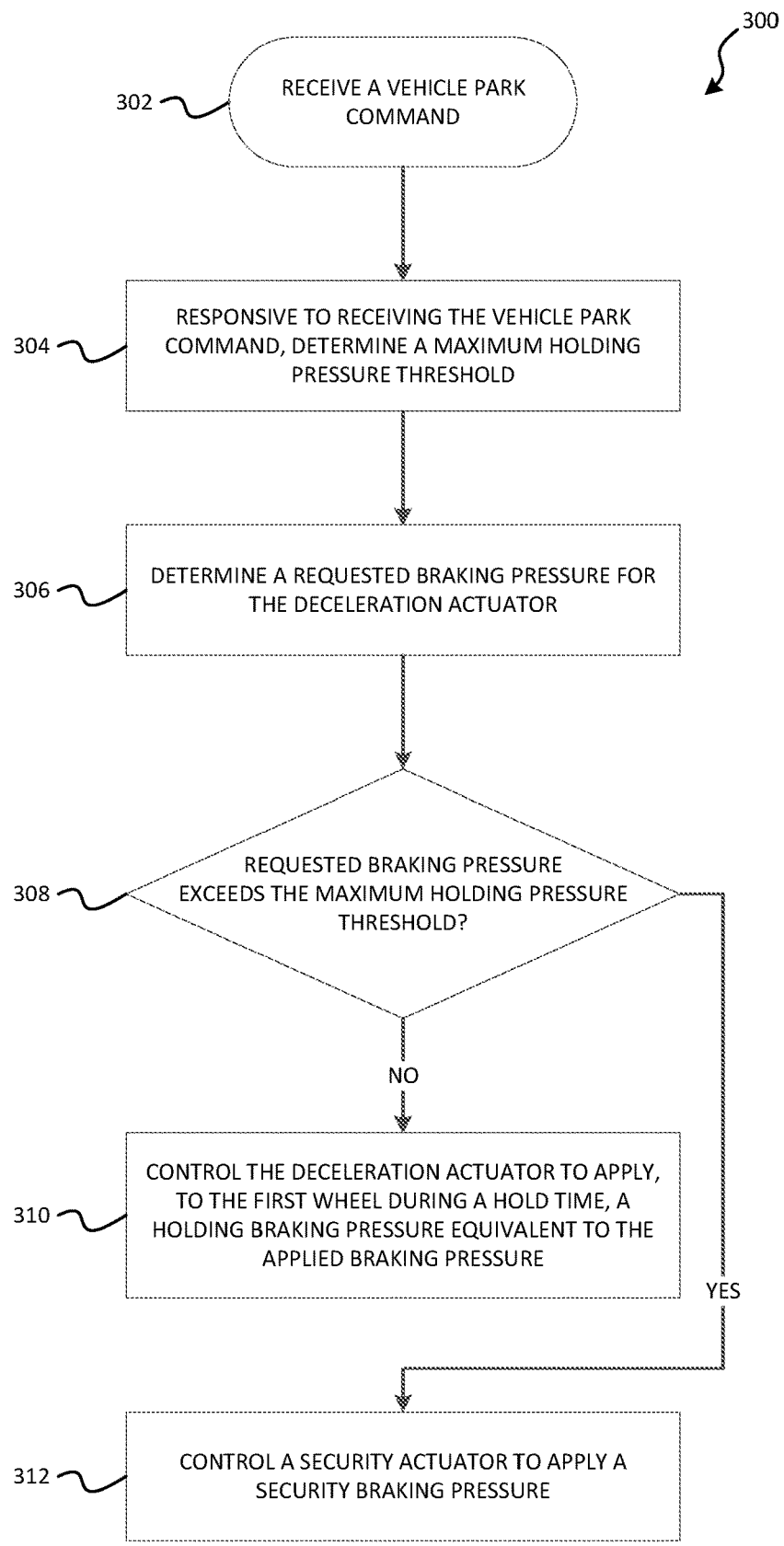
FIG. 3 is a flow chart of a method performed by the system of FIG. 1 to control a vehicle, in accordance with some embodiments.

FIG. 3 illustrates an example method 300 for controlling a vehicle using an SDG vehicle control feature to enables hydraulic holding of a vehicle without the presence or control of a driver. Although the method 300 is described in conjunction with the system 100 as described herein, the method 300 could be used with other systems and vehicles. In addition, the method 300 may be modified or performed differently than the specific example provided. As an example, the method 300 is described as being performed by the electronic control unit 104 and, in particular, the electronic processor 205. However, it should be understood that in some embodiments, portions of the method 300 may be performed by other controllers, devices, or subsystems of the system 100. For example, the method 300 may be implemented redundantly by one or more electronic processors contained in one or more communicatively coupled electronic control units.

At block 302, the electronic processor 205 receives a vehicle park command. For example, the vehicle park command may be received from the HMI 110 in response to the driver selecting "Park" for an automatic transmission of the vehicle. For the reasons set forth herein, the electronic processor 205, rather than applying a parking pawl in response to the vehicle park command, proceeds as described below (at blocks 304-310). In another example, the vehicle park command may be received from the HMI 110 in response to the driver selecting a button or other input requesting a Stop, Drop, and Go event, the selection of which indicates the driver's intention to briefly exit the vehicle 102 to perform a task. In another example, the vehicle 102 may be operating in a Stop, Drop, and Go Mode, during which bringing the vehicle to a complete stop is interpreted as or initiates a vehicle park command.

At block 304, responsive to receiving the vehicle park command, the electronic processor 205 determines a maximum holding pressure threshold. For example, in some embodiments, the electronic processor 205 receives the maximum holding pressure threshold from the braking system 106. In some embodiments, the maximum holding pressure is a constant value, pre-determined based on vehicle dimensions and other characteristics (e.g., weight, wheel base, center of gravity, and the like). The maximum holding pressure threshold represents the braking force necessary to ensure that the vehicle 102 will be secured in the event of a braking system failure with the driver absent from the vehicle 102.

At block 306, the electronic processor 205 determines a requested braking pressure for the deceleration actuator. For example, the electronic processor 205 may receive, from the braking system 106, the currently-requested braking pressure when the vehicle 102 has come to a stop. The requested braking pressure may be, for example, the braking pressure requested by the driver based on the position of a brake pedal or another mechanism or system input used by the driver to request application of the deceleration actuator. In some embodiments, the requested braking pressure may be the braking pressure requested by a highly automated parking function (or another automated function) of the vehicle 102.

At block 308, the electronic processor 205 determines whether the requested braking pressure exceeds the maximum holding pressure threshold. For example, the electronic processor 205 may arithmetically compare the requested braking pressure to the maximum holding pressure threshold. In another example, the requested braking pressure and the maximum holding pressure threshold may be provided as signals to a comparator in a circuit, which provides the comparison value to the electronic processor 205 when an requested braking pressure is present.

Figure 4:
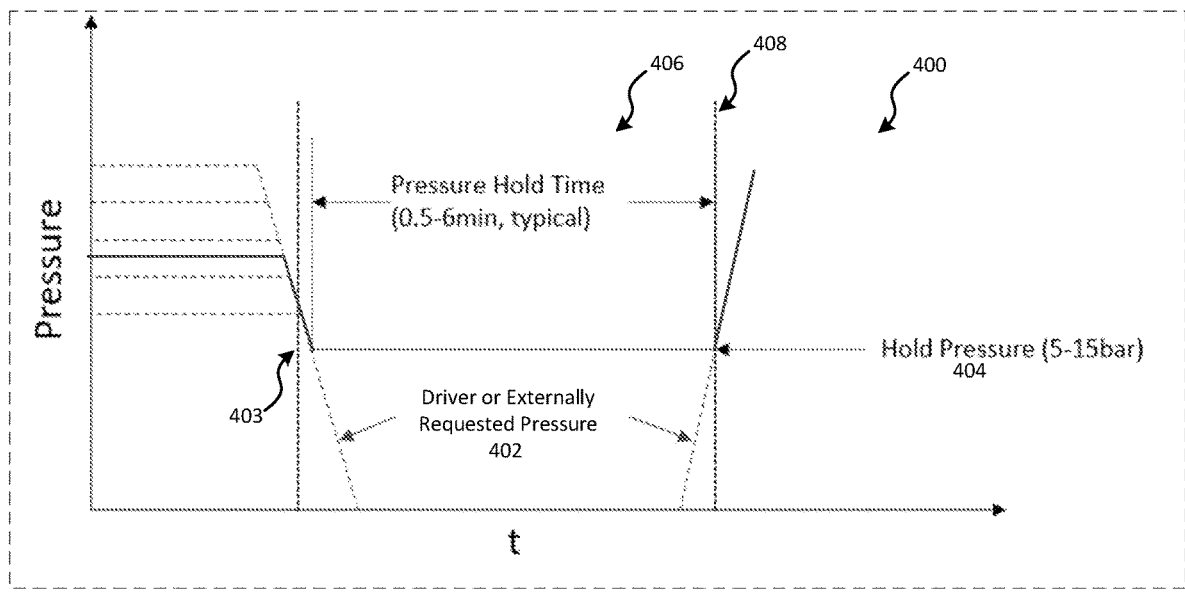
FIG. 4 is a graph illustrating aspects of the operation of the system of FIG. 1, in accordance with some embodiments.

At block 310, the electronic processor 205, responsive to determining that the requested braking pressure does not exceed the maximum holding pressure threshold (at block 308, controls the deceleration actuator to apply a holding braking pressure equivalent to the requested braking pressure to one or more wheels 118 of the vehicle 102. For example, the electronic processor 205 may transmit a braking command to the braking system 106 requesting that one or more of the braking calipers 120 maintain the requested braking pressure. The holding braking pressure is applied for a hold time, during which the driver may exit the vehicle. FIG. 4 presents a graph 400, which illustrates requested braking pressure 402 (as a dotted line) and applied holding braking pressure (as a solid line) over time. As illustrated in FIG. 4, the SDG function begins controlling the vehicle and the requested braking pressure for the deceleration actuator is determined (at block 306) at a time 403. A holding braking pressure 404 is then applied for a hold time 406. While the holding pressure is illustrated in FIG. 4 as being between five and fifteen bar, such values are provided only by way of example. As described herein, the hold time 406 varies, but has predetermined maximum limit. In the example illustrated, the hold time ends at time 408, when the SDG function ends its control of the vehicle.

Returning to FIG. 3, at block 312, when the requested braking pressure exceeds the maximum holding pressure threshold, the electronic processor 205 controls the security actuator 108 to actuate a security mechanism to prevent the vehicle 102 from moving. For example, the security actuator may cause the parking brakes 122 to apply a security braking pressure to the one or more of the wheels 118. In some embodiments, the electronic processor 205 controls the security actuator 108 to active a parking pawl. It should be noted that the holding braking pressure is applied (as described above with respect to block 310) without applying a parking brake or using a parking pawl.

In some embodiments, the holding braking pressure is only applied in limited slope conditions. For example, it may be desirable to use a security mechanism rather than hydraulic holding when the slope exceeds a 5% grade. In such embodiments, the electronic processor 205 determines a slope for the vehicle 102 (e.g., based a pitch reading received from a pitch sensor or based on an accelerometer sensor reading). In such embodiments, in response to receiving the vehicle park command, the electronic processor 205 also determines whether the slope for the vehicle exceeds a slope threshold. In such embodiments, the electronic processor 205 only applies the holding braking pressure when the requested braking pressure fails to exceed the maximum holding pressure threshold and the slope for the vehicle fails to exceed the slope threshold. In such embodiments, when only one condition is met, the electronic processor 205, rather than applying the holding braking pressure, controls the security actuator 108 to actuate a security mechanism to prevent the vehicle 102 from moving.

Figure 5:
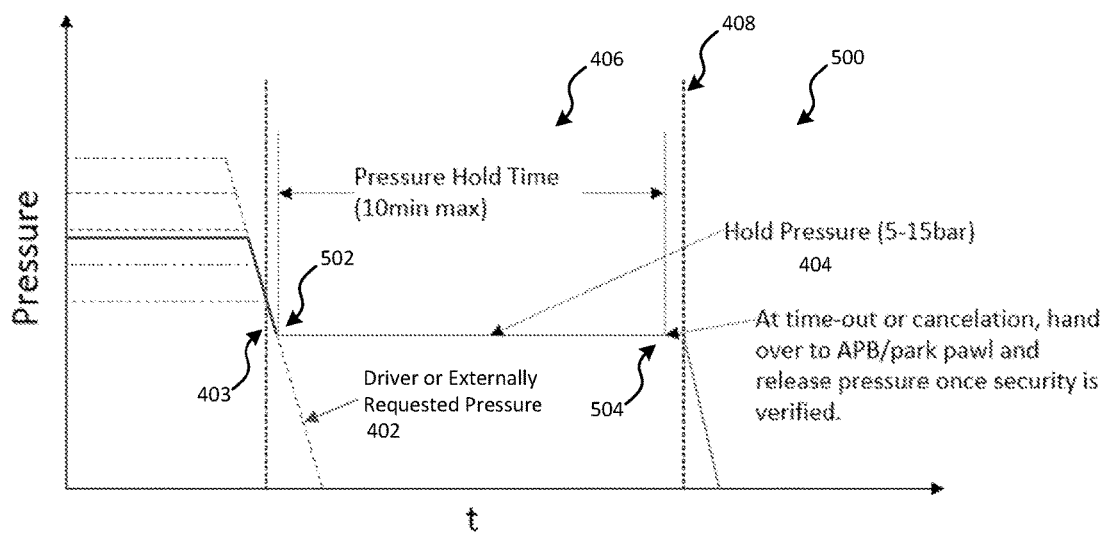
FIG. 5 is a graph illustrating aspects of the operation of the system of FIG. 1, in accordance with some embodiments.

As noted, the holding braking pressure is applied during a hold time, which, as illustrated in FIG. 5, expires may expire with a time-out or a cancellation. FIG. 5 presents a graph 500, which illustrates requested braking pressure 402 (as a dotted line) and applied holding braking pressure (as a solid line) over time. The hold time 406 begins at time 502 and proceeds to a hold time expiration time 504. The hold time 406 is presented by way of example as expiring after 10 minutes. However, hold time maximums may be set higher or lower. The electronic processor 205, responsive to the hold time expiring (e.g., at time 504), controls the security actuator 108 to actuate a security mechanism to prevent the vehicle 102 from moving and controls the deceleration actuator to release the holding braking pressure.

In some embodiments, the hold time ends when the electronic processor 205 receives a cancellation command. For example, a cancellation command may be received from the HMI 110 in response to the driver selecting a button or other input requesting cancellation of the hydraulic hold, the selection of which indicates the driver's intention to continue driving the vehicle 102. In another example, a press on an accelerator pedal by the driver, in conjunction with the driver occupancy sensor sensing that the driver is present in the vehicle 102, may be interpreted as or initiate a cancellation command. In some embodiments, a park command or driver input engaging a parking brake or parking pawl may be interpreted as or initiate a cancellation command. Responsive to receiving the cancellation command, the electronic processor 205 controls the braking system 106 to release the holding braking pressure.

Figure 6:
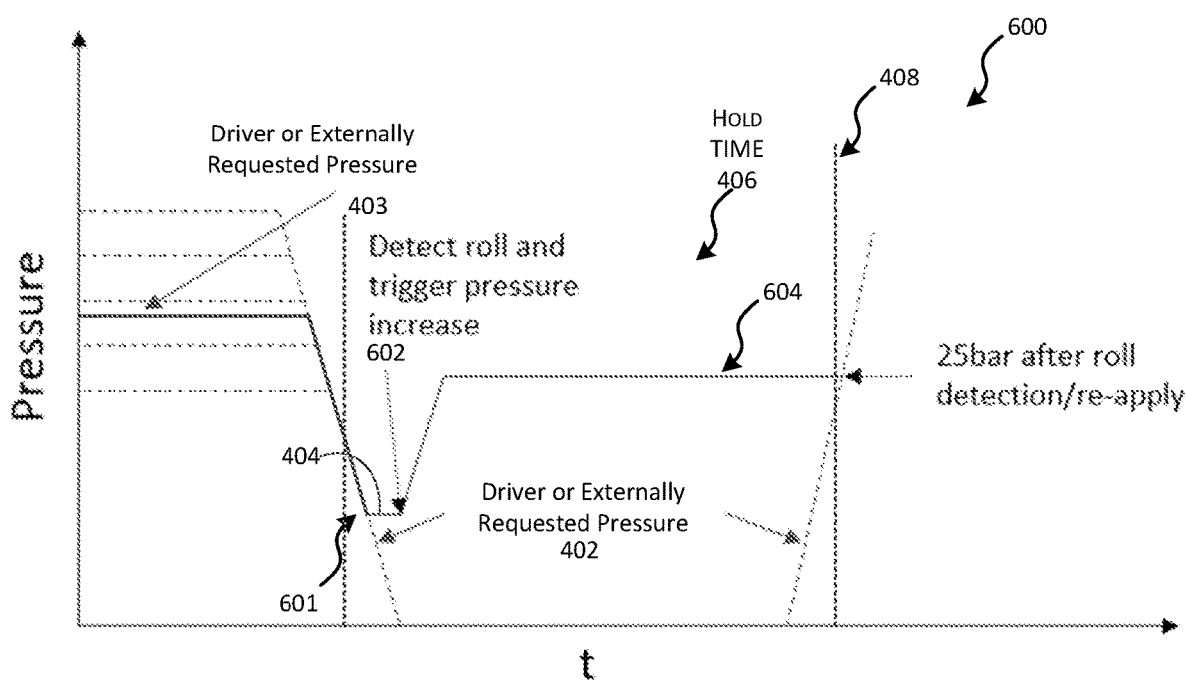
FIG. 6 is a graph illustrating aspects of the operation of the system of FIG. 1, in accordance with some embodiments.

In some embodiments, the electronic control unit 104 is configured to check for vehicle roll to ensure that the holding braking pressure will hold the vehicle 102. For example, the electronic processor 205 may detect whether the vehicle is in a roll state. For example, the electronic processor 205 may receive wheel speed readings from four wheel sensors and determine a roll state when at least three of the four sensors indicate a wheel speed above zero. In another example, the electronic processor 205 may receive motor speed readings from electronic drive motors for the vehicle 102, which indicated whether or not the vehicle 102 is moving. In another example, the electronic processor 205 may use accelerometer sensor readings to detect a roll state. Responsive to determining that the vehicle is in a roll state, the electronic processor 205 controls the deceleration actuator to apply an increased braking pressure for a remainder of the hold time (e.g., as illustrated in FIG. 6). FIG. 6 presents a graph 600, which illustrates requested braking pressure 402 (as a dotted line) and applied holding braking pressure (as a solid line) over time. At a time 601, the holding braking pressure 404 is applied. At a time 602, a roll state is detected. In response, the holding braking pressure 404 is increased to the increased holding braking pressure 604 for the remainder of the hold time.

In some embodiments, the electronic control unit 104 monitors the braking system 106 for failures and alters the hydraulic holding accordingly. In such embodiments, the electronic processor 205 may detect a failure for a braking system 106 of the vehicle 102. For example, the electronic processor 205 may receive from the braking system 106 indicators of volume displacement within the hydraulic braking system. Excessive flow within the hydraulic system while braking pressure is stable or decreasing indicates a failure. In another example, the electronic processor 205 receive from the braking system 106 indicators of motor torque within the hydraulic braking system. Excessive motor torque increase within the hydraulic system while braking pressure is stable or decreasing indicates a failure. In another example, the electronic processor 205 may detect an electrical failure in the braking system 106. In another example, the braking pressure reported from the braking system 106 may decrease despite the braking commands to hold or increase the braking pressure, indicating a failure. In another example, vehicle roll may be detected despite commands being issued for increased braking pressure.

In some embodiments, the electronic processor 205, responsive to detecting a failure, controls the braking system to apply a compensated braking pressure. The compensated braking pressure the holding braking pressure with a compensation factor added. For example, the electronic processor 205 may control the braking system 106 to immediately increase the holding braking pressure by five or more bar to hold the vehicle briefly while the parking brake is applied. After applying the compensated braking pressure, the electronic processor 205 controls the security actuator 108 to apply a security mechanism and controls the braking system 106 to release the compensated braking pressure. In some embodiments, the security mechanism is applied immediately upon detection of a failure in the braking system 106.

Figure 7:
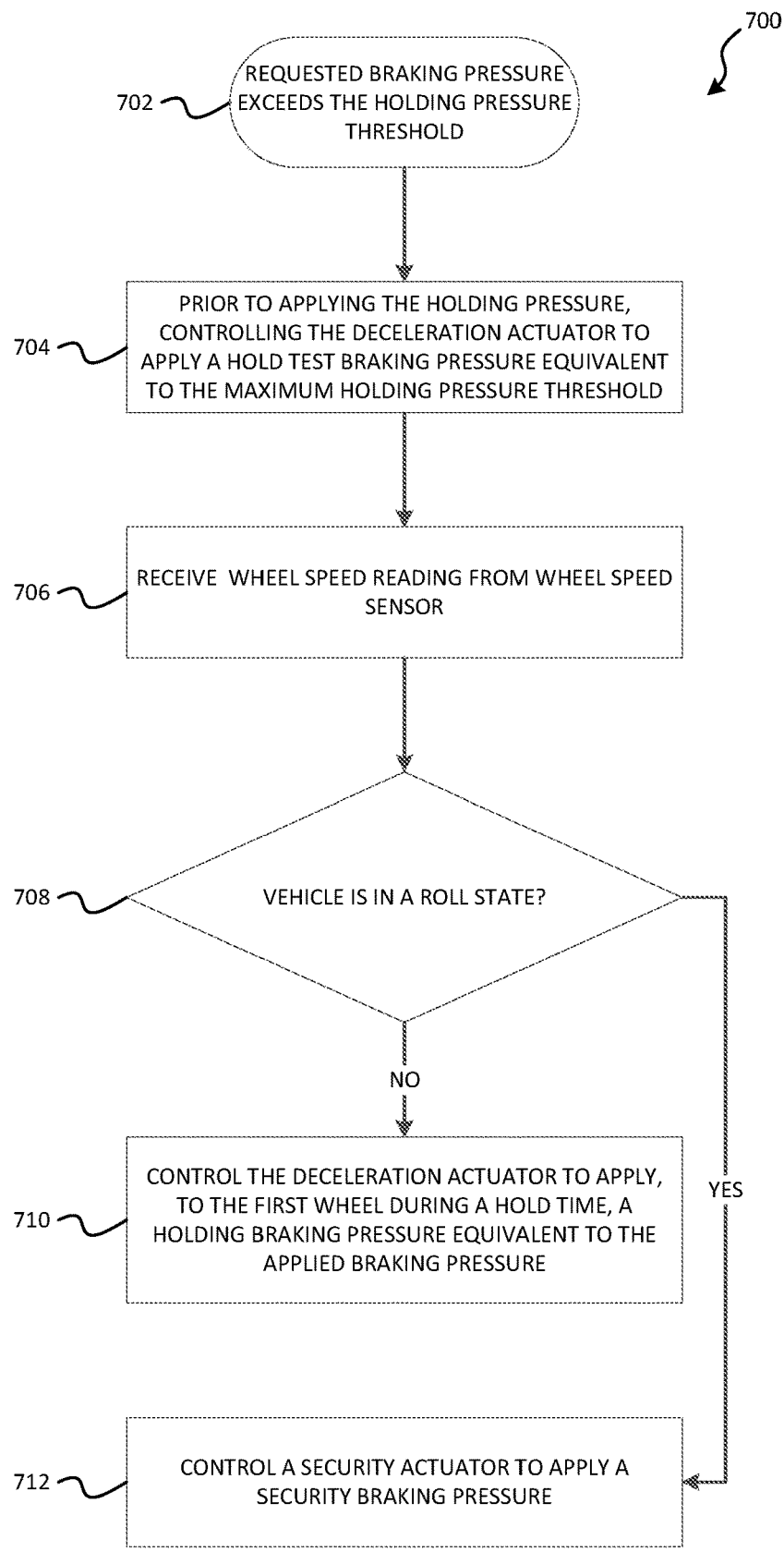
FIG. 7 is a flow chart of a method performed by the system of FIG. 1 to control a vehicle, in accordance with some embodiments.

In some embodiments, it is desirable to determine, prior to the driver exiting the vehicle, whether it is advisable to use the SDG feature (i.e., whether to apply the holding pressure or simply apply a security mechanism). Such embodiments provide, among other things, the driver with the ability to adjust the position of the vehicle such that the SDG feature may be utilized. FIG. 7 illustrates an example method 700 for controlling a vehicle by doing things to provide advantages. Although the method 700 is described in conjunction with the system 100 as described herein, the method 700 could be used with other systems and vehicles. In addition, the method 700 may be modified or performed differently than the specific example provided. As an example, the method 700 is described as being performed by the electronic control unit 104 and, in particular, the electronic processor 205. However, it should be understood that in some embodiments, portions of the method 700 may be performed by other controllers, devices, or subsystems of the system 100.

The method 700 begins at block 702, where the requested braking pressure exceeds the maximum holding pressure threshold (e.g., as determined at block 308 of the method 300).

Responsive to determining that the requested braking pressure exceeds the maximum holding pressure threshold (at block 702) and prior to controlling the deceleration actuator to apply the holding braking pressure, the electronic processor 205 performs a transition-to-hold test to determine whether to proceed with the SDG function. In some embodiments, before proceeding, the method 700 includes determining whether the driver is in the vehicle. In such embodiments, the electronic processor 205 only proceeds with the method 700 responsive to determining that the requested braking pressure exceeds the maximum holding pressure threshold and receiving a driver presence indication (e.g., receiving a driver occupancy sensor reading indicating that the sensor senses a driver in the vehicle).

The electronic processor 205 performs the transition-to-hold test by, at block 704, controlling the braking system 106 to apply a hold test braking pressure equivalent to the maximum holding pressure threshold.

At block 706, the electronic processor 205 receives a wheel speed reading from at least one wheel speed sensor for the vehicle 102. At block 708, the electronic processor 205 detects, based on a wheel speed reading received from the wheel speed sensor, whether the vehicle is in a roll state. In some embodiments, the electronic processor 205 detects a roll state for the vehicle using other means, for example, accelerometer sensor readings, electric motor speed readings, and the like.

At block 710, responsive to the transition-to-hold test indicating that the vehicle is not in a roll state (at block 708), the electronic processor 205 controls the braking system 106 to apply, during the hold time, the holding braking pressure equivalent to the requested braking pressure, as described above with respect to the method 300. In some embodiments, the electronic processor 205 provides an indicator to the driver (e.g., using the HMI 110) that the SDG function activated.

At block 712, responsive to the transition-to-hold test indicating that the vehicle is in a roll state (at block 708), the electronic processor controls the security actuator 108 to actuate a security mechanism to prevent the vehicle 102 from moving, as described above with respect to the method 300. In some embodiments, the electronic processor 205 provides an indicator to the driver (e.g., using the HMI 110) that the SDG function failed to activate.

Thus, the invention provides, among other things, a control system for a vehicle. Various features and advantages of the invention are set forth in the following claims.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

In this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

Various features, advantages, and embodiments are set forth in the following claims.

What is claimed is:

1. A system for controlling a vehicle, the system comprising:
 a deceleration actuator coupled to a first wheel of the vehicle; and
 one or more electronic processors communicatively coupled to the deceleration actuator and configured to:
 receive a vehicle park command;
 responsive to receiving the vehicle park command, determine a maximum holding pressure threshold;
 determine a requested braking pressure for the deceleration actuator;
 determine whether the requested braking pressure exceeds the maximum holding pressure threshold;
 responsive to determining that the requested braking pressure does not exceed the maximum holding pressure threshold, control the deceleration actuator to apply, to the first wheel during a hold time, a holding braking pressure equivalent to the requested braking pressure; and
 responsive to determining that the requested braking pressure exceeds the maximum holding pressure threshold and prior to controlling the deceleration actuator to apply the holding braking pressure, perform a transition-to-hold test by
 controlling the deceleration actuator to apply a hold test braking pressure equivalent to the maximum holding pressure threshold; and
 detecting whether the vehicle is in a roll state.

2. The system of claim 1, wherein the one or more electronic processors are further configured to:
 receive a cancellation command; and
 responsive to receiving the cancellation command, control the deceleration actuator to release the holding braking pressure from the first wheel.

3. The system of claim 1, further comprising:
 a security actuator coupled to a second wheel of the vehicle;
 wherein the one or more electronic processors are communicatively coupled to the security actuator and are further configured to, responsive to the hold time expiring, control the security actuator to apply a security braking pressure to the second wheel and control the deceleration actuator to release the holding braking pressure from the first wheel.

4. The system of claim 1, wherein the one or more electronic processors are further configured to:
 responsive to detecting that the vehicle is in the roll state, control the deceleration actuator to apply, to the first wheel for a remainder of the hold time, an increased holding braking pressure, which is greater than the holding braking pressure.

5. The system of claim 1, wherein the one or more electronic processors are further configured to perform the transition-to-hold test responsive to determining that the requested braking pressure exceeds the maximum holding pressure threshold and receiving a driver presence indication.

6. The system of claim 1, further comprising:
 a security actuator coupled to a second wheel of the vehicle;
 wherein the one or more electronic processors are communicatively coupled to the security actuator and are further configured to, responsive to the transition-to-hold test indicating that the vehicle is in the roll state, control the security actuator to apply a security braking pressure to the second wheel.

7. The system of claim 1, wherein the one or more electronic processors are further configured to, responsive to the transition-to-hold test indicating that the vehicle is not in the roll state, control the deceleration actuator to apply, during the hold time, the holding braking pressure equivalent to the requested braking pressure.

8. The system of claim 1, wherein the one or more electronic processors are further configured to:
determine a slope for the vehicle;
responsive to receiving the vehicle park command, determine whether the slope for the vehicle exceeds a slope threshold; and
control the deceleration actuator to apply, to the first wheel during the hold time, the holding braking pressure equivalent to the requested braking pressure responsive to determining both that the requested braking pressure does not exceed the maximum holding pressure threshold and that the slope for the vehicle does not exceed the slope threshold.

9. The system of claim 1, further comprising:
a braking system of the vehicle, the braking system including the deceleration actuator;
a security actuator coupled to a second wheel of the vehicle;
wherein the one or more electronic processors are communicatively coupled to the security actuator and the braking system, and are further configured to:
detect a failure for the braking system of the vehicle;
responsive to detecting the failure, control the deceleration actuator to apply a compensated braking pressure to the first wheel, wherein the compensated braking pressure is based on the holding braking pressure and a compensation factor;
control the security actuator to apply a security braking pressure to the second wheel; and
control the deceleration actuator to release the compensated braking pressure from the first wheel.

10. The system of claim 1, further comprising:
a security actuator coupled to a second wheel of the vehicle;
wherein the one or more electronic processors are communicatively coupled to the security actuator and are further configured to control the deceleration actuator to apply, to the first wheel during the hold time, the holding braking pressure without applying a security braking pressure with the security actuator.

11. The system of claim 1, further comprising:
a security actuator coupled to a second wheel of the vehicle;
a first power source; and
a second power source independent of the first power source;
wherein the deceleration actuator is powered by the first power source and the security actuator is powered by the second power source.

12. A method for controlling a vehicle, the method comprising:
receiving, with an electronic processor, a vehicle park command;
responsive to receiving the vehicle park command, determining, with the electronic processor, a maximum holding pressure threshold;
determining a requested braking pressure for a deceleration actuator coupled to a first wheel of the vehicle;
determining whether the requested braking pressure exceeds the maximum holding pressure threshold;
responsive to determining that the requested braking pressure does not exceed the maximum holding pressure threshold, controlling the deceleration actuator to apply, to the first wheel during a hold time, a holding braking pressure equivalent to the requested braking pressure; and
responsive to determining that the requested braking pressure exceeds the maximum holding pressure threshold and prior to controlling the deceleration actuator to apply the holding braking pressure, performing a transition-to-hold test by:
controlling the deceleration actuator to apply a hold test braking pressure equivalent to the maximum holding pressure threshold; and
detecting whether the vehicle is in a roll state.

13. The method of claim 12, further comprising:
receiving, with the electronic processor, a cancellation command; and
responsive to receiving the cancellation command, controlling the deceleration actuator to release the holding braking pressure from the first wheel.

14. The method of claim 12, further comprising:
responsive to the hold time expiring, controlling a security actuator coupled to a second wheel of the vehicle to apply a security braking pressure to the second wheel and controlling the deceleration actuator to release the holding braking pressure from the first wheel.

15. The method of claim 12, further comprising:
responsive to detecting that the vehicle is in the roll state, controlling the deceleration actuator to apply, to the first wheel for a remainder of the hold time, an increased holding braking pressure, which is greater than the holding braking pressure.

16. The method of claim 12, further comprising:
performing the transition-to-hold test responsive to determining that the requested braking pressure exceeds the maximum holding pressure threshold and receiving a driver presence indication.

17. The method of claim 12, further comprising:
responsive to the transition-to-hold test indicating that the vehicle is in the roll state, controlling a security actuator coupled to a second wheel of the vehicle to apply a security braking pressure to the second wheel.

18. The method of claim 12, further comprising:
responsive to the transition-to-hold test indicating that the vehicle is not in the roll state, controlling the deceleration actuator to apply, during the hold time, the holding braking pressure equivalent to the requested braking pressure.

19. The method of claim 12, further comprising:
determining a slope for the vehicle;
responsive to receiving the vehicle park command, determining whether the slope for the vehicle exceeds a slope threshold; and
controlling the deceleration actuator to apply, to the first wheel during the hold time, the holding braking pressure equivalent to the requested braking pressure responsive to determining both that the requested braking pressure does not exceed the maximum holding pressure threshold and that the slope for the vehicle does not exceed the slope threshold.

20. The method of claim 12, further comprising:
detecting a failure for a braking system of the vehicle, the braking system including the deceleration actuator;

responsive to detecting the failure, controlling the deceleration actuator to apply a compensated braking pressure to the first wheel, wherein the compensated braking pressure is based on the holding braking pressure and a compensation factor;

controlling a security actuator coupled to a second wheel of the vehicle to apply a security braking pressure to the second wheel; and controlling the deceleration actuator to release the compensated braking pressure from the first wheel.

21. The method of claim 12, wherein controlling the deceleration actuator to apply the holding braking pressure to the first wheel during the hold time includes applying the holding braking pressure without controlling a security actuator to apply a security braking pressure.

* * * * *